Nov. 26, 1963
C. A. BOEHME
3,111,762
FISH LOCATING INSTRUMENT
Filed March 14, 1962
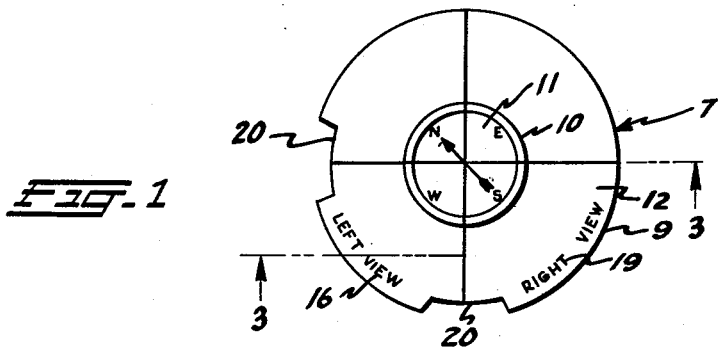
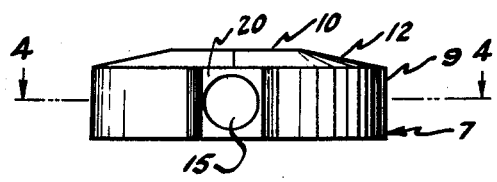
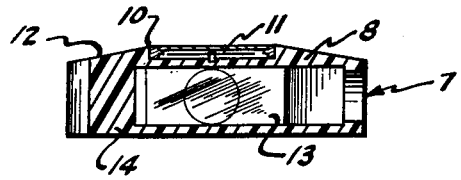
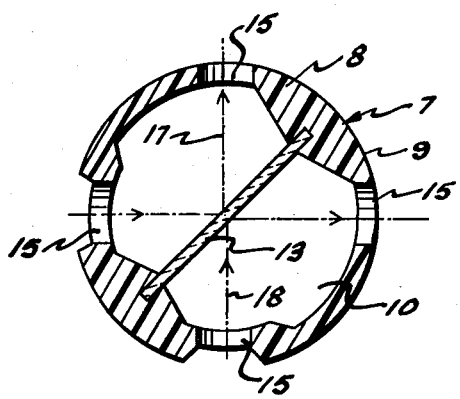
INVENTOR
CARL A. BOEHME

United States Patent Office 3,111,762
Patented Nov. 26, 1963

3,111,762
FISH LOCATING INSTRUMENT
Carl A. Boehme, 5908 38th Ave. N.,
Minneapolis 22, Minn.
Filed Mar. 14, 1962, Ser. No. 179,624
6 Claims. (Cl. 33—64)

This invention relates to the piscatorial art, which is more commonly known as fishing and more particularly to an instrument for locating a given place on the water where one has either caught fish before or known others to be successful at this place.

Many is the time when a person fishing for either sport or a livelihood has desired to return to the same spot only to find that he is unable to do so for lack of means of determining exactly where it is in relation to such landmarks as buildings or trees on nearby shore etc.

It is therefore an object of this invention to provide what I personally call a fish locating instrument that makes it possible for one to return to approximately the same spot on the water or land where fishing has on previous occasions been good.

Another object of this invention is to provide a fish locating instrument that is compact and can readily be carried in one's pocket or tackle box at all times.

Another object of this invention is to provide a fish locating instrument that is foolproof in its use and can therefore be correctly used by anyone regardless of their age or sex.

Another object of this invention is to provide a fish locating instrument that does not require the use of expensive and complicated machinery for its manufacture and can therefore be mass produced and retailed at a price well within the reach of every fisherman.

Another object of this invention is to provide a fish locating instrument that will greatly increase one's catch over a period of time by permitting a person's return to the same successful fishing grounds without loss of time in locating the same.

Still another object of this invention is to provide a fish locating instrument of the character herein described having a body that can readily be manufactured out of any non-magnetic material such as aluminum, wood and/or plastic.

Other and further objects and advantages of this fish locating instrument will be hereinafter described, and the novel features thereof defined in the appended claims.

Referring to the drawing:

FIGURE 1 is a top view of this invention;

FIGURE 2 is a front view of this invention;

FIGURE 3 is a sectional view of this invention taken substantially along line 3—3 of FIGURE 1 as viewed in the direction indicated by the arrows;

FIGURE 4 is a sectional view of this invention taken substantially along line 4—4 of FIGURE 2 as viewed in the direction indicated by the arrows.

Similar reference characters refer to similar parts throughout the several views of the drawing.

Having reference now to the drawing in detail, there is generally indicated by the character 7 a fish locating instrument embodying a cylindrical disk-like housing 8 having a continuous side 9 around the periphery thereof and a top 10 having a flat recessed center portion in which is placed a compass 11 and a downwardly sloping portion 12 as clearly illustrated in FIGURES 2 and 3 of the appended drawing.

The housing 8 which is hollow and has an angularly disposed transparent reflector 13 that is rectangular in side elevation mounted therein as can be seen from examination of FIGURE 4. It, the housing, also has a bottom 14 and four circular openings 15 in the side 9. Said openings are ninety degrees apart.

As clearly shown in FIGS. 1, 2, and 4, the left view opening is at the left of FIG. 4, and the right view opening is nearest to the bottom of the sheet. The transparent reflector is between the left view opening and the right view opening.

One looking through the left view opening, sees any object that is directly ahead, through the opening that is directly opposite to the left view opening. He also sees, superimposed on the said view, a view from the left. The light from the second view comes through opening 15, to his left and reflected from transparent reflector 13 to his eye.

Similarly, one looking through the right view aperture, sees a view of any object that is directly ahead of him. He also sees, superimposed on said view, a view from the right.

The device is used in the following way. Suppose that a person has found a desirable place to fish, and he is interested in returning to that place. He will pick out a permanent, distant object, such as a tree, a large rock or an island, as a land mark. He will look through one of the apertures. Suppose that he looks through the left view aperture first. He will turn the device until he sees the said object directly ahead. Superimposed upon the view of said object will be a view from the left. He will make a note, either a mental note or a written note, of the object that he is sighting, of the view from the left and of the compass bearing with respect to the line of sight. To check his position, he can sight the same object through the right view opening. He will see the land mark and superimposed upon the view of the land mark, a view from the right. He will make a note of the compass bearing and of the view from the right.

The next time that he wishes to return to this place he will go to the approximate place and locate the land mark. Using his compass, he will find a point with the same compass bearing with respect to the land mark. He will go towards or away from the land mark along the compass bearing until he sees the noted right and left view while sighting the land mark.

There is only one place from which he can sight the land mark and see the noted left view and the noted right view, with their respective noted bearings. In view of this it is clear that my device is very accurate.

Although it has not previously been stated in the description of the construction of this invention, that area of the side 9 in which those two of the circular openings are located that are next to one's eye when this unique invention is in use is recessed as noted in FIGURE 1 of the appended drawings and characterized by the reference numeral 20.

From the foregoing it will now be seen that there is herein provided a fish locating instrument which accomplishes all of the objects of this invention, and others, including many advantages of great practical utility and commercial importance.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

Having now described my invention and the manner in which the same may be used, what I claim as new and desire to secure by Letters Patent is:

1. A fish locating instrument of the character described, comprising a hollow housing having four openings in the side thereof located ninety degrees apart, a reflector surface centrally disposed within said housing and at a forty-five degree angle to any one of the said openings, and a compass mounted within the center and top of the said housing.

2. A fish locating instrument of the character described, comprising a hollow cylindrical housing having four circular openings in the side thereof located ninety degrees apart, a reflector surface centrally disposed within said housing and at a forty-five degree angle to any one of the said openings, and a compass mounted within the center and top of the said housing.

3. A fish locating instrument of the character described, comprising a hollow cylindrical housing having four circular openings in the side thereof located ninety degrees apart, a rectangular reflector surface centrally disposed within said housing and at a forty-five degree angle to any one of the said openings, and a compass mounted within the center and top of the said housing.

4. A fish locating instrument of the character described, comprising a hollow cylindrical housing having four circular openings in the side thereof located ninety degrees apart, a top portion and a flat center portion within the center of the top portion, a rectangular reflector surface centrally disposed within said housing and at a forty-five degree angle to any one of said openings, a compass mounted within the flat center portion, said housing further having a downwardly sloping portion extending from the periphery of the compass to the side of said housing.

5. A fish locating instrument of the character described, comprising a non-metallic hollow housing having four circular openings in the side thereof located ninety degrees apart, a top portion and a flat center portion within the center of the top portion, a rectangular reflector surface centrally disposed within said housing and at a forty-five degree angle to any one of said openings, a compass mounted within the flat center portion, said housing further having a downwardly sloping portion extending from the periphery of the compass to the side of said housing, and the said housing also having a bottom removably secured thereto.

6. A fish locating instrument of the character described, comprising a non-metallic hollow housing having four circular openings in the side thereof located ninety degrees apart, recessed areas at two of the circular openings so that one of said two openings may be placed next to a person's eye when said instrument is being sighted through, a top portion and a flat center portion within the center of the top portion, a rectangular reflector surface centrally disposed within said housing and at a forty-five degree angle to any one of said openings, a compass mounted within the flat center portion, said housing further having a downwardly sloping portion extending from the periphery of the compass to the side of said housing, and the said housing also having a bottom removably secured thereto.

No references cited.